May 8, 1956  H. NAUMANN  2,744,975
CONTROL DEVICE FOR MOTOR VEHICLES
Filed Feb. 1, 1952  2 Sheets-Sheet 1
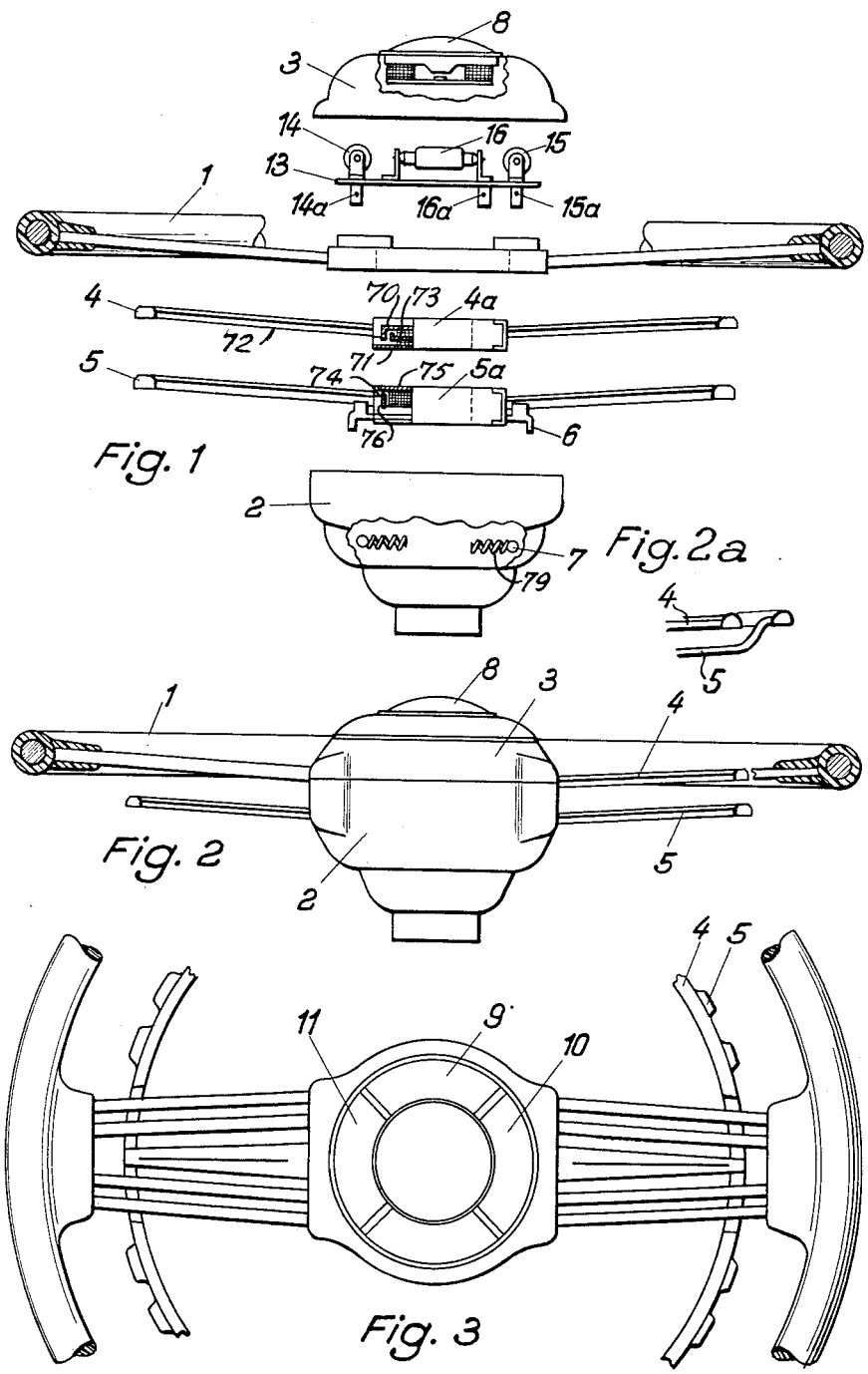

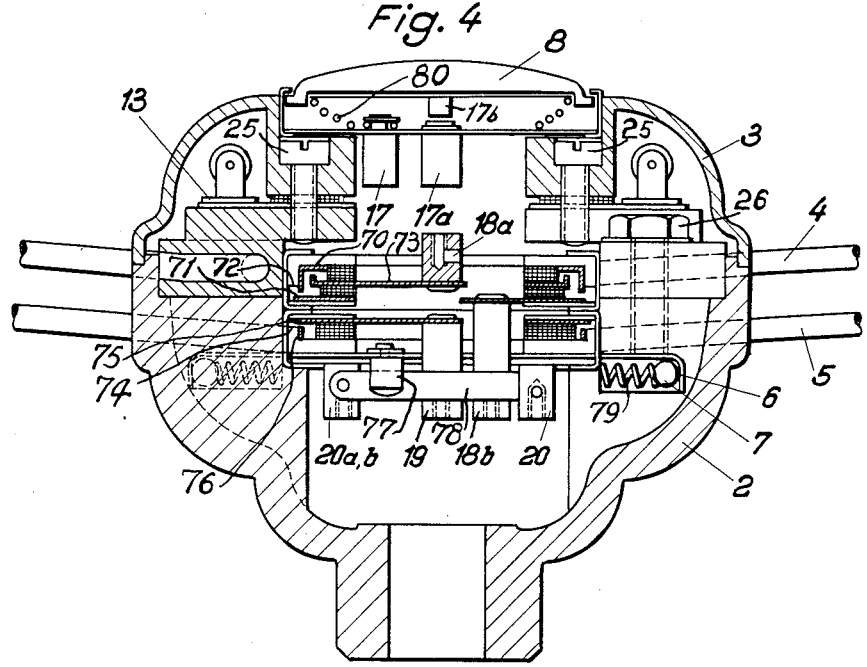
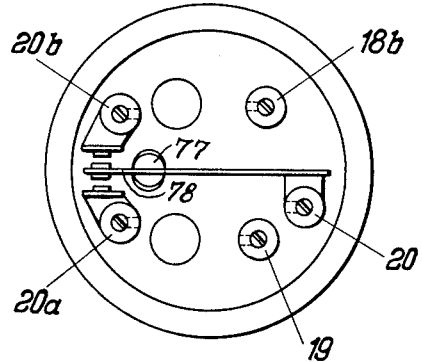
HORST NAUMANN
Inventor

United States Patent Office 2,744,975
Patented May 8, 1956

2,744,975

CONTROL DEVICE FOR MOTOR VEHICLES

Horst Naumann, Aschaffenburg (Main), Germany, assignor to Firma Lenkradwerk Gustav Petri, Aschaffenburg (Main), Germany Application February 1, 1952, Serial No. 269,402

1 Claim. (Cl. 200—61.56)

The present invention relates to a control device in motor vehicles. More particularly, the device is designed for controlling the headlight, the horn, the direction indicator, and the like.

It is already known to make the control for the horn of a motor vehicle in the form of a control button or a ring and to arrange these control devices in or on the hub of the steering wheel. It is, furthermore, known to arrange the control for the direction indicators on the control ring for actuating the horn, in such a manner that rotation of the ring in one or the other direction will cause an actuation of the direction indicator on the left hand or right hand sides, respectively. Finally, it has been proposed to arrange the other electrical controlled devices of motor vehicles, such as the control for the starter of the motor, switches for different headlight adjustments, etc. within the confines of the steering wheel, so that their actuation can be effected without the driver's hand being removed from the wheel.

In the known devices of the last mentioned kind, members for actuating the electrical controls, such as switch buttons, control levers or the like, are arranged for instance on a spoke of the steering wheel, on its rim, or on a part either belonging to the steering wheel or being attached thereto for that particular purpose. Contact is made in this way by having a special button, lever, or the like, designed for each particular control. In the known arrangement there is consequently a large number of buttons, levers, etc. which are difficult to keep apart and whose actuation requires a comparatively large amount of attention on the part of the driver. Thereby, the advantage gained through arrangement of the controls within the confines of the steering wheel, so that the driver's hand may remain thereon, is partly lost.

It is the object of the present invention to provide controls for the electrical devices of a motor vehicle, which are likewise arranged within the confines of the steering wheel, but in such a way as to avoid the multiplicity of buttons, etc. which would distract the attention of the driver.

It is another object of the present invention to provide fewer controls which permit of simple handling and a simplified arrangement in or on the steering wheel.

Further particulars of the invention will be seen from the detailed description thereof in conjunction with the accompanying drawings.

Generally speaking, the invention consists in the arrangement of two control rings on the steering wheel of a motor vehicle, which can be easily reached by the hand of the driver. These rings are arranged either one on top of the other or both in the same plane. One of the rings is actuated by pressure from above, the other by pressure from below; or one or both rings may be brought into different contact-making positions by rotation.

In a special embodiment there may be a switch button or other switch arranged in the hub of the steering wheel.

It is one of the main advantages of the said invention that for actuating all the devices concerned, only two controls have to be operated, said controls being in the form of rings which may be contacted by the fingers of the driver wherever his hands may lie during driving and without even one hand being changed in its position.

The new device according to the invention is illustrated by way of example in the accompanying drawings, but it should be understood that the embodiments shown are given by way of illustration and not of limitation and that many modifications in the details of the device may be made without departing from the spirit of the invention.

In the accompanying drawings,

Fig. 1 shows the steering wheel according to the invention with the parts disassembled;

Fig. 2 shows the same steering wheel with parts assembled;

Fig. 2a is a modified arrangement of the control rings;

Fig. 3 shows the steering wheel seen from the top;

Fig. 4 is a section through the hub of the steering wheel in another embodiment of the invention; and Fig. 5 is a view of a detail in said last mentioned embodiment.

Referring to Figs. 1–3, the rim of the steering wheel is designated by 1, the hub by 2, and a cap covering the hub by 3. For the control of the electrical devices, an upper control ring 4 and a lower control ring 5 are attached to the steering wheel, which may alternatively be arranged one above the other (Fig. 2a).

The center of the control rings is formed by boxes 4a and 5a, respectively, said boxes housing the control device proper, so that every control ring with its attachments forms a separate unit. One of the control rings, 4 for instance, may be designed to operate the horn; in this case the arrangement is made, in a manner known per se, that upon slight pressure on the ring a normal horn signal will be actuated, whereas upon strong pressure a different signal will be given.

Depression of the ring 4 (Figs. 1, 4 and 5) will cause an upper contact piece 70 to move downwards by means of a mechanical connection 72 to establish electrical contact between a contact 73, conductively connected to contact 18a, and a contact 71, conductively connected to a contact 18b, whereby current may pass between contacts 18a and 18b.

The other control ring 5 houses in the center box 5a a switch for the headlight in such a manner that, upon pressure from below in upward direction, a distance light will be switched in and, upon repeated pressure being exerted, the light will be switched off. The device may also function in the opposite way. The center portion of the control rings may be rotatable and adapted to form the switch for a direction indicator, so that upon rotation to one side the left-hand indicator will be actuated, upon rotation to the other side the right hand indicator will become visible.

When the parts of the wheel are assembled, they are held in position by fastening means, such as screws 25 and 26, as shown in Fig. 4 for the other embodiment of the invention.

When ring 5 is pushed upwards (Figs. 1, 4 and 5), a mechanical connection 74 will raise a lower contact piece 76 towards an upper contact piece 75, thereby establishing an electrical connection to a contact 19.

Rotation of ring 5 (Figs. 4 and 5) will cause a corresponding angular displacement of a pin 77 which will in turn deflect a conducting rod 78 to make contact with either a contact 20a or a contact 20b, depending on the direction of rotation of ring 5. Accordingly a current path will be established between a contact 20 and either contact 20a or 20b which current will preferably serve to operate a direction indicator.

Instead of direction indicators, blinkers or the like may be arranged which can be actuated in similar manner. In the examples shown in Fig. 2 of the drawing, the lower control ring 5 is constructed as a switch for actuating the horn as well as the indicators. For fixing the lower control ring in any position after rotation, the center box has attached thereto a finger 6, and the hub of the steering wheel is provided with corresponding members for engagement, for instance with spring-controlled balls 7.

The expansion springs 79 force the balls 7 outwards, whereby the balls 7 frictionally engage the fingers 6 on the box of ring 5. This frictional engagement temporarily holds the ring 5 in the desired angular position.

In the center of cap 3 there is a yielding push-button 8 which may serve as control for starting the motor or for controlling some other device.

The push button 8 is held in place by a coil spring 80. Pressure on the push button will depress the coil spring 80 and close contacts 17a, 17b.

The cap has arranged therein windows of different colors or transparent panes 9, 10 and 11 (Fig. 3); below the cap, there is a lamp ring 13 with control lamps 14, 15 and 16. Connected to said lamps are terminals 14a, 15a and 16a, respectively, which are so arranged that for instance lamps 14 or 15 become lighted, depending on whether the left-hand or right-hand indicator is actuated by means of the lower control ring, whereas lamp 16 becomes lighted as soon as the headlight will be operated.

Figs. 4 and 5 show a steering wheel hub with contact arrangement in the interior, the distribution of the switches being similar to the one just described. The contacts for the starter or for some other device are designated by 17 and 17a, contacts for the horn by 18a and 18b, and the contacts for the headlight by 19, those for the indicators by 20, 20a and 20b.

The several parts could be arranged in a different way from the above described one. Furthermore, modifications could be made in the number and location or the design of the parts described without departing from the spirit of the invention.

What I claim is:

A control device in association with the steering wheel of a motor vehicle for the electrically operated devices of the vehicle, comprising two control rings arranged at so short a distance from the steering wheel as to be reached by the fingers of the driver's hand without the hand being removed from the steering wheel, each of said control rings having its own switch connections for operation of the devices to be electrically controlled, switch control means on one of said rings operable by pressure from below, switch control means on said other ring operable from above, at least one of said control rings having switch control means operable by rotation of said ring, said switch control means being independent of each other, said switch control means upon operation being capable of causing the electrically operated devices to become actuated, the steering wheel having a hub and a cap thereon, panes of different colors set into said cap, a lamp-ring below said cap, and a plurality of lamps on said ring, one lamp registering with each colored pane, each of said lamps indicating the actuation of one electrically controlled device.

References Cited in the file of this patent

UNITED STATES PATENTS

| | | |
|---|---|---|
| 1,093,441 | Laurance | Apr. 14, 1914 |
| 1,686,600 | Cragg | Oct. 9, 1928 |
| 1,856,588 | Peterson | May 3, 1932 |
| 1,909,040 | Bobroff | May 16, 1933 |
| 2,138,163 | Harris | Nov. 29, 1938 |
| 2,147,007 | Peters et al. | Feb. 14, 1939 |
| 2,202,781 | Kennedy | May 28, 1940 |
| 2,246,255 | Juergens | June 17, 1941 |
| 2,276,477 | George | Mar. 17, 1942 |
| 2,491,968 | Gilbert | Dec. 20, 1949 |

FOREIGN PATENTS

| | | |
|---|---|---|
| 262,708 | Great Britain | Jan. 6, 1927 |
| 444,704 | Germany | May 25, 1927 |
| 455,915 | Germany | Feb. 11, 1928 |